(12) United States Patent
Kang et al.

(10) Patent No.: US 12,299,277 B2
(45) Date of Patent: May 13, 2025

(54) ELECTRONIC DEVICE, AND METHOD BY WHICH ELECTRONIC DEVICE INPUTS INFORMATION BY USING EXTERNAL ELECTRONIC DEVICE

(71) Applicant: Samsung Electronics Co., Ltd., Suwon-si (KR)

(72) Inventors: Sangmook Kang, Suwon-si (KR); Dasom Lee, Suwon-si (KR); Jaehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/468,325

(22) Filed: Sep. 15, 2023

(65) Prior Publication Data
US 2024/0004544 A1 Jan. 4, 2024

Related U.S. Application Data

(63) Continuation of application No. PCT/KR2022/005508, filed on Apr. 18, 2022.

(30) Foreign Application Priority Data

Apr. 16, 2021 (KR) .................. 10-2021-0049941

(51) Int. Cl.
*G06F 3/04886* (2022.01)
*G06F 3/041* (2006.01)
(Continued)

(52) U.S. Cl.
CPC ........ *G06F 3/04886* (2013.01); *G06F 3/0416* (2013.01); *G06F 3/1454* (2013.01); *G06F 21/44* (2013.01); *G06F 21/82* (2013.01)

(58) Field of Classification Search
CPC .. G06F 21/31; G06F 2221/032; G06F 3/0416; G06F 3/04886
See application file for complete search history.

(56) References Cited

U.S. PATENT DOCUMENTS

| 10,361,802 B1 * | 7/2019 | Hoffberg-Borghesani ................. G06F 3/00 |
| 2005/0212763 A1 | 9/2005 | Okamura |

(Continued)

FOREIGN PATENT DOCUMENTS

| EP | 2 800 345 A1 | 11/2014 |
| JP | 2015-200952 A | 11/2015 |

(Continued)

OTHER PUBLICATIONS

KR102064397B1 임지수; 강민구 Electronic Device and Operation Method Thereof (English machine translation) Aug. 31, 2013 (Year: 2013).*

(Continued)

*Primary Examiner* — Van N Chow
(74) *Attorney, Agent, or Firm* — Jefferson IP Law, LLP

(57) ABSTRACT

An electronic device is provided. The electronic device includes communication circuitry, a display module, a processor operatively connected to the communication circuitry and the display, and memory, wherein the memory stores instructions, when executed, the processor controls a field for inputting text through the display is displayed, receive a user input for the field for inputting the text, confirm whether the field is a predetermined type, in response to the reception of the user input, confirm information related to the type of keyboard to be output through an external electronic device, if the field is the predetermined type, transmit, to the external electronic device, the confirmed information related to the type of keyboard through the communication circuitry, receive, from the external electronic device, data input on (Continued)

the basis of the keyboard corresponding to the keyboard type, and input data for the field on the basis of the received data.

18 Claims, 16 Drawing Sheets

(51) Int. Cl.
  *G06F 3/14*  (2006.01)
  *G06F 21/44*  (2013.01)
  *G06F 21/82*  (2013.01)

(56) References Cited

U.S. PATENT DOCUMENTS

| | | | |
|---|---|---|---|
| 2010/0125811 A1* | 5/2010 | Moore | H04M 1/7243 |
| | | | 715/846 |
| 2014/0139439 A1 | 5/2014 | Park | |
| 2014/0253412 A1 | 9/2014 | Blaich et al. | |
| 2015/0128292 A1 | 5/2015 | Malecki et al. | |
| 2016/0349970 A1* | 12/2016 | Everitt | G06F 3/04883 |
| 2016/0350060 A1 | 12/2016 | Park et al. | |
| 2017/0032573 A1 | 2/2017 | Dow et al. | |
| 2019/0011979 A1 | 1/2019 | Faaborg et al. | |
| 2024/0004544 A1* | 1/2024 | Kang | G06F 3/0488 |

FOREIGN PATENT DOCUMENTS

| | | |
|---|---|---|
| JP | 6314715 B2 | 4/2018 |
| KR | 10-2006-0044790 A | 5/2006 |
| KR | 10-2010-0024603 A | 3/2010 |
| KR | 10-2014-0064384 A | 5/2014 |
| KR | 10-2015-0026136 A | 3/2015 |
| KR | 10-2015-0050825 A | 5/2015 |
| KR | 10-2016-0140059 A | 12/2016 |
| KR | 10-2064397 B1 | 1/2020 |
| WO | 2017/172647 A1 | 10/2017 |

OTHER PUBLICATIONS

International Search Report with Written Opinion and English translation dated Jul. 26, 2022; International Appln. No. PCT/KR2022/005508.

Extended European Search report dated Jul. 25, 2024, issued in European Application No. 22788514.2-1218.

* cited by examiner

ELECTRONIC DEVICE, AND METHOD BY WHICH ELECTRONIC DEVICE INPUTS INFORMATION BY USING EXTERNAL ELECTRONIC DEVICE

CROSS-REFERENCE TO RELATED APPLICATION(S)

This application is a continuation application, claiming priority under § 365(c), of an International application No. PCT/KR2022/005508, filed on Apr. 18, 2022, which is based on and claims the benefit of a Korean patent application number filed on Apr. 16, 2021, in the Korean Intellectual Property Office, the disclosure of which is incorporated by reference herein in its entirety.

BACKGROUND

1. Field

The disclosure relates to an electronic device and a method of inputting information using an external electronic device in the electronic device.

2. Description of Related Art

Typically, an electronic device may refer to a device that performs a specific function according to a loaded program, such as an electronic notebook, a portable multimedia player, a mobile communication terminal, a tablet personal computer (PC), a video/audio device, a desktop/laptop computer, or a vehicle navigation device, as well as a home appliance. For example, these electronic devices outputs stored information as sound or an image. As the integration level of electronic devices increases and high-speed and large-capacity wireless communication becomes common, a smartphone is equipped with various functions.

For example, a communication function, an entertainment function such as games, a multimedia function such as music/video playback, a communication and security function for mobile banking, schedule management, or an electronic wallet function are integrated into one electronic device. A user may identify various types of information displayed on the electronic device, and input information through an input means (e.g., a touch screen) of the electronic device.

The above information is presented as background information only to assist with an understanding of the disclosure. No determination has been made, and no assertion is made, as to whether any of the above might be applicable as prior art with regard to the disclosure.

SUMMARY

Information input by a user through an input means (e.g., a keyboard) of an electronic device may be displayed on a screen of the electronic device. The user-input information may include information requiring security (or sensitive information) (e.g., confidential information or personal information).

The electronic device may display the input result of the security-requiring information by replacing the actual input with a set character (e.g., a special symbol) different from the actual input, thereby preventing the input information from being exposed. According to various embodiments, when the user's selection of a particular position on the keyboard is externally visible even without displaying the input information on the screen, the user-input information (e.g., information requiring security) may be leaked.

Aspects of the disclosure are to address at least the above-mentioned problems and/or disadvantages and to provide at least the advantages described below. Accordingly, an aspect of the disclosure is to provide an electronic device for allowing information to be input using an external electronic device (e.g., a wearable device) communicatively connected to the electronic device, when data is input to a predetermined field on the electronic device, in order to prevent external exposure of information requiring security (e.g., confidential information or personal information), and a method of inputting information using an external electronic device in the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a display module, at least one processor operatively connected to the communication module and the display module, and memory operatively connected to the at least one processor. The memory stores instructions which, when executed by the at least one processor, cause the at least one processor to control a field for inputting text to be displayed through the display module, receive a user input to the field for inputting text, identify whether the field is a field of a predetermined type in response to the reception of the user input, when the field is a field of the predetermined type, identify information related to a keyboard type to be output through an external electronic device, transmit the identified information related to the keyboard type to the external electronic device through the communication module, receive data input based on a keyboard corresponding to the keyboard type from the external electronic device, and input data to the field based on the received data.

In accordance with another aspect of the disclosure, a method of inputting information using an external electronic device in an electronic device is provided. The method includes displaying a field for inputting text through a display module, receiving a user input to the field for inputting text, identifying whether the field is a field of a predetermined type in response to the reception of the user input, when the field is a field of the predetermined type, identifying information related to a keyboard type to be output through an external electronic device, transmitting the identified information related to the keyboard type to the external electronic device through a communication module, receiving data input based on a keyboard corresponding to the keyboard type from the external electronic device, and inputting data into the field based on the received data.

According to various embodiments, when data is input to a predetermined field on an electronic device, information is allowed to be input using an external electronic device (e.g., a wearable device) communicatively connected to the electronic device, thereby preventing external exposure of information requiring security (e.g., confidential information or personal information).

According to various embodiments, when data is input to a predetermined field on an electronic device, only security-requiring information or personal information is allowed to be input through an external electronic device, with the usability of the electronic device maintained, thereby preventing external exposure of the security-requiring information or the personal information, while enhancing the usability of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
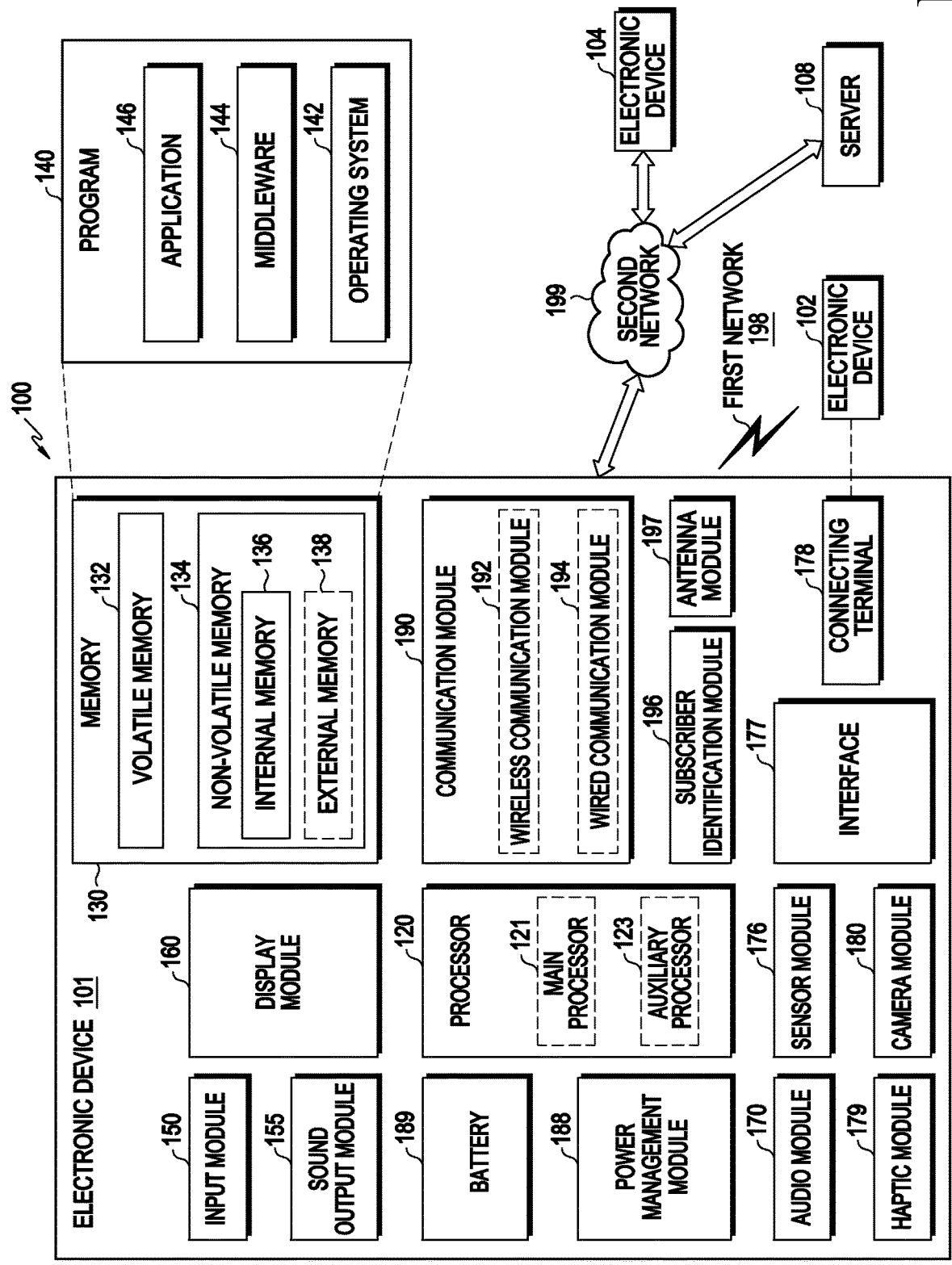
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 includes, for example, a microphone, a mouse, a keyboard, a key (e.g., a button), or a digital pen (e.g., a stylus pen).

The sound output module 155 may output sound signals to the outside of the electronic device 101. The sound output module 155 includes, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 includes, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 includes, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 includes, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, is selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
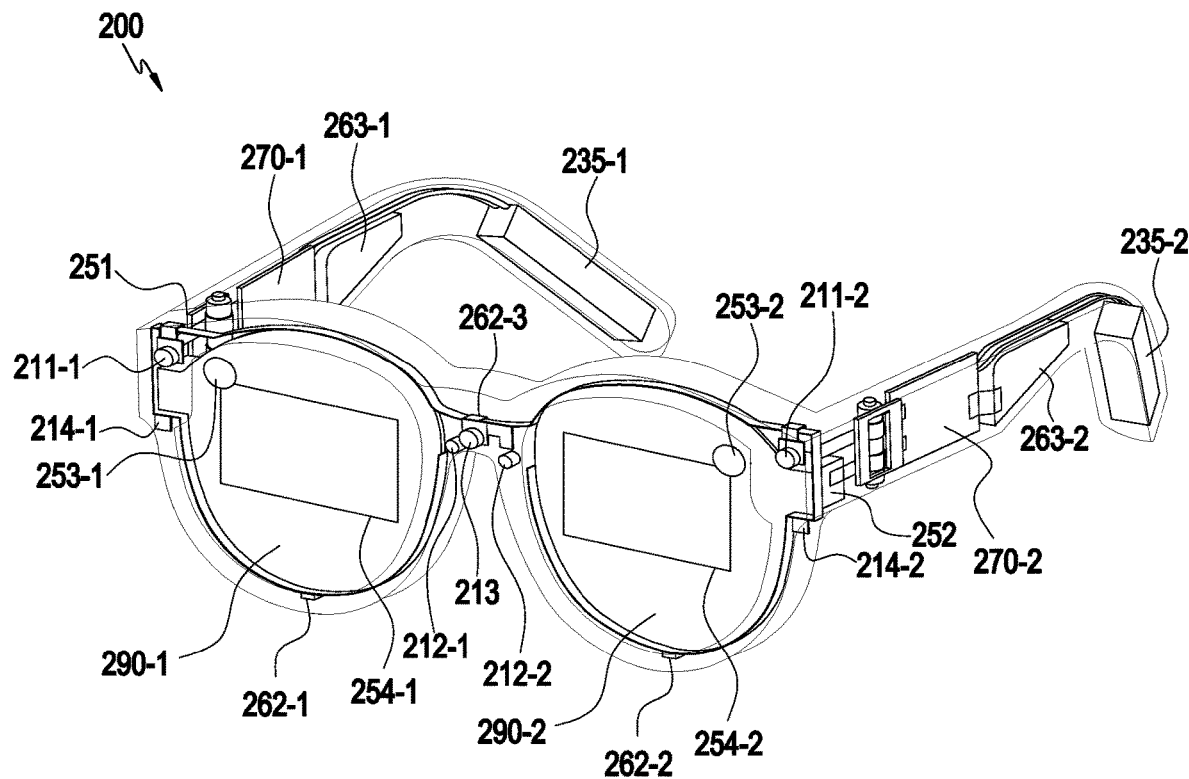
FIG. 2 illustrates a structure of a wearable device according to an embodiment of the disclosure.

FIG. 2 illustrates a structure of a wearable device according to an embodiment of the disclosure.

According to various embodiments, the wearable device is described as, but not limited to, an eyeglasses-type device in the following embodiments. For example, the wearable device applied to various embodiments includes at least one of an accessory type (e.g., a watch, a ring, a bracelet, an anklet, a necklace, eyeglasses, contact lenses, or a head mounted device or head mounted display (HMD)), a fabric or clothing type (e.g., electronic clothing), a body-attached type (e.g., a skin pad or tattoo), or a bio-implantable circuit.

Referring to FIG. 2, according to various embodiments, a wearable device 200 (e.g., an eyeglasses-type device) (e.g., the electronic device 102 or 104 of FIG. 1) may include one or more first cameras 211-1 and 211-2, one or more second cameras 212-1 and 212-2, and one or more third cameras 213. According to various embodiments, images obtained through the one or more first cameras 211-1 and 211-2 may be used for detection of a user hand gesture, user head tracking, and/or spatial recognition. According to various embodiments, the one or more first cameras 211-1 and 211-2 may be global shutter (GS) cameras. According to various embodiments, the one or more first cameras 211-1 and 211-2 may perform a simultaneous localization and mapping (SLAM) operation through depth imaging. According to various embodiments, the one or more first cameras 211-1 and 211-2 may perform spatial recognition for 6DoF.

According to various embodiments, images obtained through the one or more second cameras 212-1 and 212-2 may be used to detect and track the user's pupils. According to various embodiments, the one or more second cameras 212-1 and 212-2 may be GS cameras. According to various embodiments, the one or more second cameras 212-1 and 212-2 may correspond to the left and right eyes, respectively, and the performances of a plurality of second cameras 212-1 and 212-2 may be equal or similar.

According to various embodiments, the one or more third cameras 213 may be high-resolution cameras. According to various embodiments, the one or more third cameras 213 may perform auto-focusing (AF) and tremor correction functions. According to various embodiments, the one or more third cameras 213 may be GS cameras or rolling shutter (RS) cameras.

According to various embodiments, the wearable device 200 may include one or more light emitting elements 214-1 and 214-2. The light emitting elements 214-1 and 214-2 may be different from a later-described light source that irradiates light onto a screen output area of a display. According to various embodiments, the light emitting elements 214-1 and 214-2 may irradiate light to facilitate eye pupil detection in detecting and tracking the user's eye movements through the one or more second cameras 212-1 and 212-2. According to various embodiments, each of the light emitting elements 214-1 and 214-2 may include an LED. According to various embodiments, the light emitting elements 214-1 and 214-2 may irradiate light in the infrared region. According to various embodiments, the light emitting elements 214-1 and 214-2 may be attached around a frame of the wearable device 200. According to various embodiments, the light emitting elements 214-1 and 214-2 may be located around the one or more first cameras 211-1 and 211-2 and assist in gesture detection, head tracking, and spatial recognition of the one or more first cameras 211-1 and 211-2, when the wearable device 200 is used in a dark environment. According to various embodiments, the light emitting elements 214-1 and 214-2 may be located around the one or more third cameras 213 and assist in image acquisition of the one or more third cameras 213, when the wearable device 200 is used in a dark environment.

According to various embodiments, the wearable device 200 may include batteries 235-1 and 235-2. The batteries 235-1 and 235-2 may store power to operate the other components of the wearable device 200.

According to various embodiments, the wearable device 200 may include a first display 251, a second display 252, one or more input optical members 253-1 and 253-2, one or more transparent members 290-1 and 290-2, and one or more screen display portions 254-1 and 254-2. According to various embodiments, the first display 251 and the second display 252 includes, for example, a liquid crystal display (LCD), a digital mirror device (DMD), a liquid crystal on silicon (LCoS), an organic light emitting diode (OLED), or a micro light emitting diode (micro LED). According to various embodiments, when the first display 251 and the second display 252 are made of one of a liquid crystal display, a digital mirror display, or a silicon liquid crystal display, the wearable device 200 may include a light source to irradiate light onto a screen output region of the display. According to various embodiments, when the first display 251 and the second display 252 are capable of generating light on their own (e.g., when they are made of one of an OLED or a micro LED), the wearable device 200 may provide a virtual image of relatively good quality to the user without including a separate light source.

According to various embodiments, the one or more transparent members 290-1 and 290-2 may be disposed to face the user's eyes, when the user wears the wearable device 200. According to various embodiments, the one or more transparent members 290-1 and 290-2 may include at least one of a glass plate, a plastic plate, or a polymer. According to various embodiments, the user may see the outside world through the one or more transparent members 290-1 and 290-2, when wearing the wearable device 200. According to various embodiments, the one or more input optical members 253-1 and 253-2 may direct light generated by the first display 251 and the second display 252 to the user's eyes. According to various embodiments, an image is formed on the one or more screen display portions 254-1 and 254-2 above the one or more transparent members 290-1 and 290-2 based on light generated by the first display 251 and the second display 252, and the user may view the image formed on the one or more screen display portions 254-1 and 254-2.

According to various embodiments, the wearable device 200 may include one or more light waveguides (not shown). The light waveguides may transmit light generated by the first display 251 and the second display 252 to the user's eyes. The wearable device 200 may include one light waveguide corresponding to each of the left eye and the right eye. According to various embodiments, the light waveguide may include at least one of glass, plastic, or a polymer. According to various embodiments, the light waveguide includes a nano-pattern, for example, a grating structure in a polygonal or curved shape, formed on one internal or external surface. According to various embodiments, the light waveguide may include a free-form prism, and in this case, provide incident light to the user through a reflective mirror. According to various embodiments, the light waveguide may include at least one of a diffractive element (e.g., a diffractive optical element (DOE) or holographic optical element (HOE)) or a reflective element (e.g., a reflective mirror), and direct display light emitted from the light source to the user's eyes, using the at least one diffractive element or reflective element included in the light waveguide. According to various embodiments, the diffractive element may include an input/output optical member. According to various embodiments, the reflective element may include a total reflection member.

According to various embodiments, the wearable device 200 may include one or more voice input devices 262-1, 262-2, and 262-3 and one or more voice output devices 263-1 and 263-2.

According to various embodiments, the wearable device 200 may include a first PCB 270-1 and a second PCB 270-2. The first PCB 270-1 and the second PCB 270-2 may transmit electrical signals to components included in the wearable device 200, such as a first camera 411, a second camera 412, a third camera 413, a display module 450, an audio module 461, and a sensor 480, which will be described later with reference to FIG. 4B. According to various embodiments, the first PCB 270-1 and the second PCB 270-2 may be flexible printed circuit boards (FPCBs). According to various embodiments, each of the first PCB 270-1 and the second PCB 270-2 may include a first substrate, a second substrate, and an interposer disposed between the first substrate and the second substrate.

Figure 3:
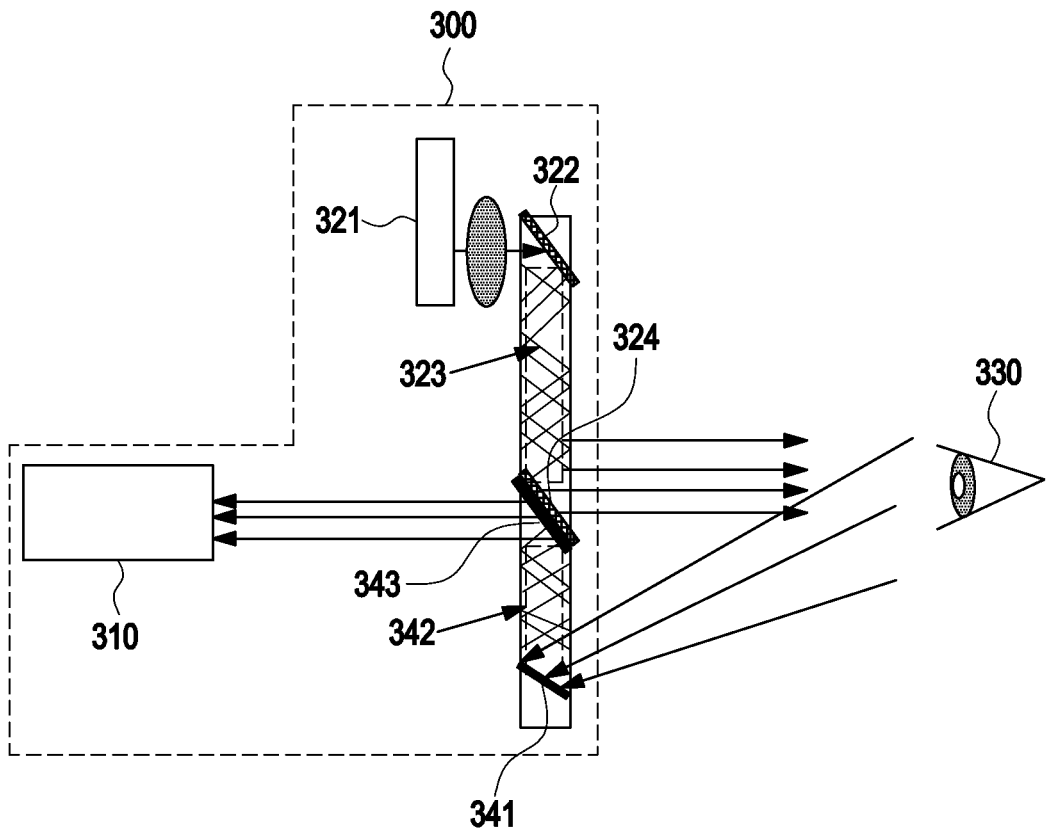
FIG. 3 illustrates an eye tracking camera structure of a wearable device according to an embodiment of the disclosure.

FIG. 3 illustrates an eye tracking camera structure of a wearable device according to an embodiment of the disclosure.

Referring to FIG. 3, a wearable device 300 (e.g., an eyeglasses-type device) may include an eye tracking (ET) camera 310, a display 321, an input optical member 322, a first waveguide 323, an output optical member 324, a first splitter 341, a second waveguide 342, and a second splitter 343.

According to various embodiments, an image of a user's pupil 330 may be captured by the ET camera 310 through the first splitter 341 (e.g., a splitter for eye tracking), the second waveguide 342, and the second splitter 343. The ET camera 310 may track the user's gaze by detecting the pupil 330 in the captured image and identifying the movement of the detected pupil 330.

According to various embodiments, an image output through the display 321 may be reflected through the input optical member 322 and the first waveguide 323 and displayed through the output optical member 324. Simultaneously with outputting the image through the display 321, the wearable device 300 may track the user's gaze by identifying the movement of the user's pupil 330.

Figure 4A:
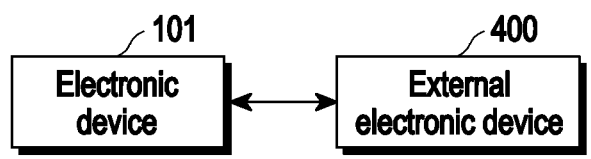
FIG. 4A is a block diagram illustrating an electronic device and an external electronic device according to an embodiment of the disclosure.

FIG. 4A is a block diagram illustrating an electronic device and an external electronic device according to an embodiment of the disclosure.

Referring to FIG. 4A, the electronic device 101 may be communicatively connected to an external electronic device 400 (e.g., the wearable device 200 of FIG. 2 or the wearable device 300 of FIG. 3).

According to various embodiments, the electronic device 101 may display at least one text input field on a screen. When a user input is received for the at least one text input field, and the text input field is a field of a predetermined type (e.g., a field requiring security or a field specified by the user), the electronic device 101 may transmit keyboard-related information (e.g., information related to a keyboard type) to the external electronic device 400, for inputting data into the text input field. The external electronic device 400 may display a keyboard based on the keyboard-related information received from the electronic device 101 and receive data input based on the displayed keyboard. The external electronic device 400 may transmit the data input based on the keyboard to the electronic device 101. The electronic device 101 may receive the data transmitted from the external electronic device 400, and process input of the data to the text input field based on the received data. In various embodiments described below, a keyboard may refer to a user interface (UI) including at least one key (e.g., number, letter, special character, or symbol) for a user input. In various embodiments, the keyboard may be implemented in the form of an image on a screen or touch screen or in the form of a virtual image or hologram in a 3D space, to which the disclosure is not limited. The term keyboard may be replaced by, but not limited to, the term keypad, virtual keyboard, or virtual keypad.

Figure 4B:
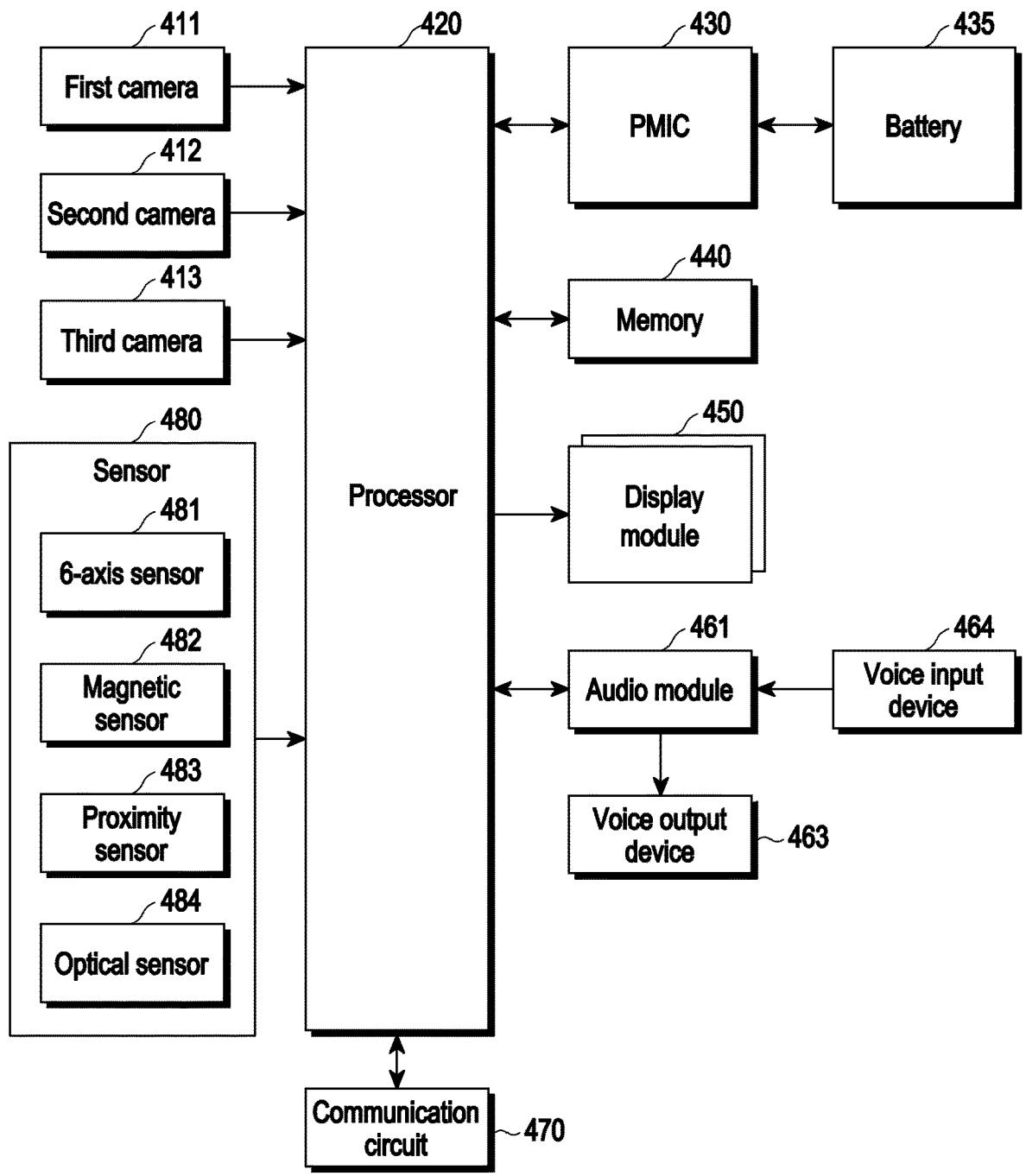
FIG. 4B is a block diagram illustrating an external electronic device according to an embodiment of the disclosure.

FIG. 4B is a block diagram illustrating an external electronic device according to an embodiment of the disclosure.

The external electronic device 400 (e.g., the wearable device 200 of FIG. 2 or the wearable device 300 of FIG. 3) may include the first camera 411, the second camera 412, the third camera 413, a processor 420, a PMIC 430, a battery 435, memory 440, the display module 450, the audio module 461, a voice input device 464, a voice output device 463, a communication circuit 470, and the sensor 480.

According to various embodiments, the details of the one or more first cameras 211-1 and 211-2, the one or more second cameras 212-1 and 212-2, and the one or more third cameras 213 described above with reference to FIG. 2 may apply equally or similarly to the first camera 411, the second camera 412, and the third camera 413, respectively. According to various embodiments, the wearable device 400 may include at least one of the first camera 411, the second camera 412, or the third camera 413 in plurality.

According to various embodiments, the processor 420 may control the other components of the external electronic device 400, such as the first camera 411, the second camera 412, the third camera 413, the PMIC 430, the memory 440, the display module 450, the audio module 461, the communication circuit 470, and the sensor 480, and perform various data processes or computations.

According to various embodiments, the PMIC 430 may convert power stored in the battery 435 to have currents or voltages required for other components of the external electronic device 400 and supply the converted power to the other components of the external electronic device 400.

According to various embodiments, the memory 440 may store various data used by at least one component (e.g., the processor 420 or the sensor 480) of the external electronic device 400.

According to various embodiments, the display module 450 may display a screen to be provided to the user. According to various embodiments, the display module 450 may include the first displays 251, the second displays 252, the one or more input optical members 253-1 and 253-2, the one or more transparent members 290-1 and 290-2, and the one or more screen display portions 254-1 and 254-2 described above with reference to FIG. 2.

According to various embodiments, the audio module 461 may be connected to the voice input device 464 and the voice output device 463, and convert data input through the voice input device 464 and data to be output to the voice output device 463. The voice input device 464 may include a microphone, and the voice output device 463 may include a speaker and an amplifier.

According to various embodiments, the communication circuit 470 may support establishment of a wireless communication channel with an electronic device external to the wearable device 400 and communication through the established communication channel.

According to various embodiments, the sensor 480 may include a 6-axis sensor 481, a magnetic sensor 482, a proximity sensor 483, and/or an optical sensor 484.

Referring to FIGS. 5A, 5B, 5C, 6, 7A, 7B, 8A, and 8B, methods of inputting information using an external electronic device in an electronic device according to various embodiments will be described. Various embodiments described below may be performed through the electronic device 101 or the external electronic device (e.g., the wearable device 200 of FIG. 2, the wearable device 300 of FIG. 3, or the external electronic device 400 of FIG. 4A or 4B) described with reference to FIGS. 1, 2, 3, 4A, and 4B.

Figure 5A:
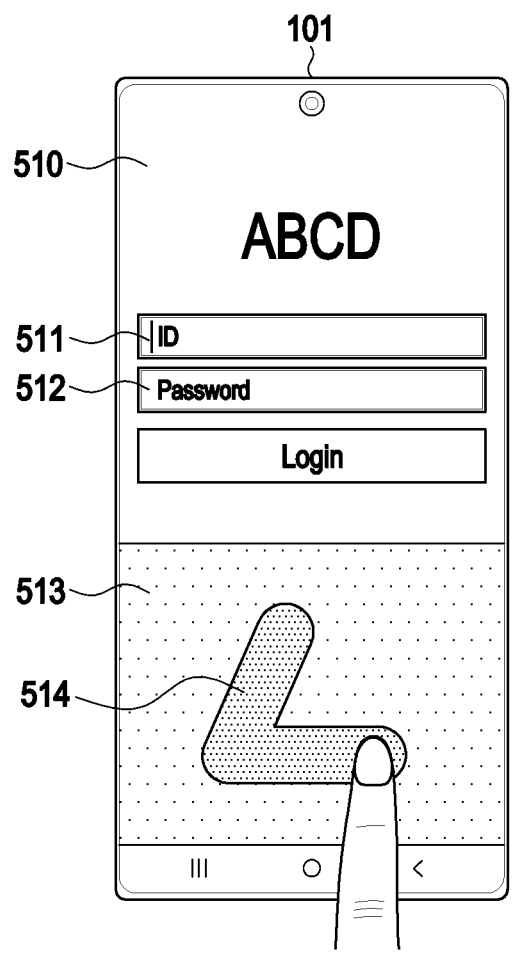
FIG. 5A illustrates a screen displayed on an electronic device according to an embodiment of the disclosure.

FIG. 5A illustrates a screen displayed on an electronic device according to an embodiment of the disclosure.

Figure 5B:
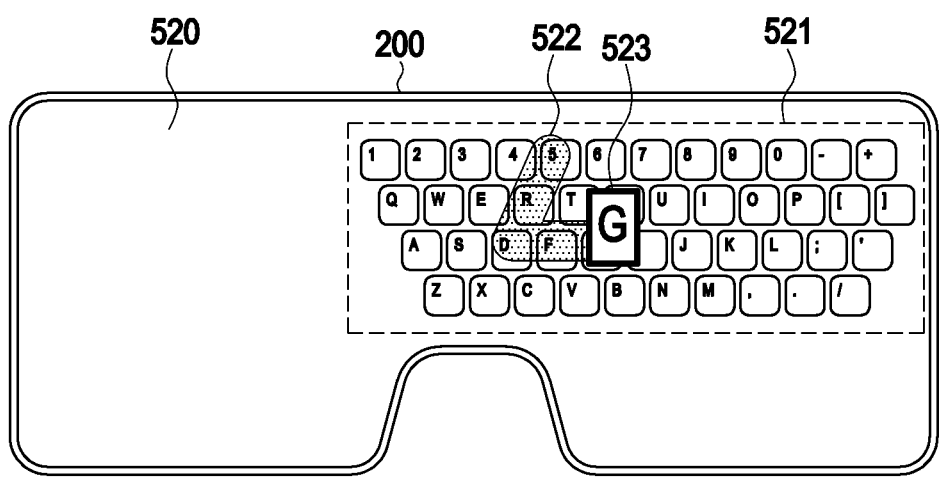
FIG. 5B illustrates a screen displayed on a wearable device according to an embodiment of the disclosure.

FIG. 5B illustrates a screen displayed on a wearable device according to an embodiment of the disclosure.

Figure 5C:
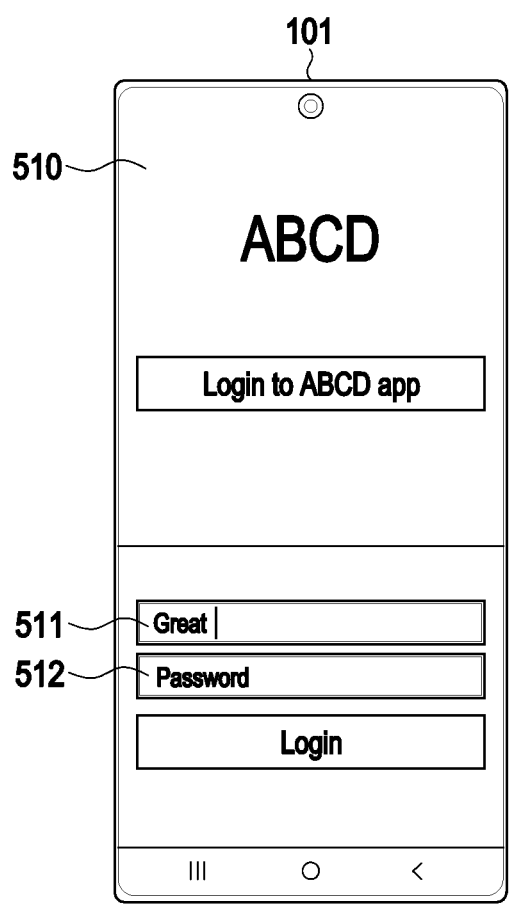
FIG. 5C illustrates an input result screen displayed on an electronic device according to an embodiment of the disclosure.

FIG. 5C illustrates an input result screen displayed on an electronic device according to an embodiment of the disclosure.

Referring to FIG. 5A, the electronic device 101 may display at least one text input field (or text input-enabled field) on a screen 510 of the electronic device 101 through the display module (e.g., the display module 160 of FIG. 1). For example, the text input field includes, but not limited to, a field set to "edittext" or "textfield". The electronic device 101 may display an ID input field 511 and/or a password input field 512 for logging into a specific webpage or a specific homepage, as text input fields on the screen 510. According to various embodiments, the ID input field 511 or the password input field 512 may be referred to or configured as a secure information input field, a sensitive information input field, a secret information input field, or a personal information input field. However, the embodiments described below are not limited to these terms. In the following description, a field in which exposure of input data is not desired, such as a secure information input field, a sensitive information input field, a confidential information input field, or a personal information input field, or a field in which exposure of a data inputting situation is not desired will be collectively referred to as a "secure information input field (or sensitive information input field)" for convenience of description. According to various embodiments, the secure information input field (or sensitive information input field) may include a field for inputting secret information such as a password or a field for inputting personal information such as a name, an age, or an address.

According to various embodiments, when the attribute of a text input field is password, such as the password input field 512, the text input field may be determined to be a secure information input field (or sensitive information input field). According to various embodiments, at least one input field (e.g., the ID input field 511 and the password input field 512) of a webpage including a text input field with an attribute of password, such as the password input field 512, may be set as a secure information input field (or sensitive information input field). According to various embodiments, when identification information (e.g., an ID) in the text input field includes a word (e.g., secure, secret, or password) related to secret information or a word (e.g., a user ID, a name, or a resident registration number) related to personal information, the text input field may be determined to be a secure information input field (or sensitive information input field). According to various embodiments, when the text field is linked to a trusted user interface (TUI), the text input field may be determined to be a secure information input field (or sensitive information input field). According to various embodiments, the user may further set a specific text input field as a secure information input field (or sensitive information input field) in addition to a preset secure information input field (or sensitive information input field), as will be described later with reference to FIGS. 7A and 7B.

According to various embodiments, when receiving a user input to a text input field, the electronic device 101 may identify whether the text input field is a predetermined field (e.g., a secure information input field or a field specified as a secure information input field by the user). For example, the user input to the text input field includes an input that causes the text input field to be in a focus on state. For example, the user input includes a touch (e.g., direct touch or hovering) on a region corresponding to the text input field or focus on based on movement of a cursor to the text input field or a field change by inputting a tap button. According to various embodiments, when detecting a touch input to or a focus on the text input field, the electronic device 101 may identify whether the text input field is a predetermined field (e.g., a secure information input field or a field specified as a secure information input field by a user setting).

According to various embodiments, when a user input to the text input field is received and the text input field is identified as a predetermined field, the electronic device 101 may identify keyboard-related information for the external electronic device 400 (e.g., the wearable device 200) instead of displaying a set keyboard on the screen 510 of the electronic device 101. The electronic device 101 may transmit the identified keyboard-related information to the external electronic device 400 (e.g., the wearable device 200) communicatively connected to the electronic device 101.

According to various embodiments, the keyboard-related information may include information related to a keyboard type. The keyboard type may include a keyboard that is the same as or similar to a keyboard displayed on the electronic device 101, for a user input to a general text input field (e.g., a user input to a text input field that is not a predetermined field). According to various embodiments, the keyboard type may include a keyboard in a different form from the keyboard displayed on the electronic device 101, for a user input to a general text input field.

According to various embodiments, the external electronic device 400 may receive the keyboard-related information (e.g., the information related to the keyboard type) from the electronic device 101, and display a keyboard (e.g., keyboards 521, 620, and 821 illustrated in FIGS. 5B, 6, and 8B to be described later) on a screen through the display module 450 based on the received keyboard-related information.

According to various embodiments, when the user input to the text input field is received and the text input field is identified as the predetermined field, the electronic device 101 may generate a keyboard using at least one piece of authentication information (e.g., a pin number or authorization number and signature information) used during connection to the external electronic device 400, instead of displaying a keyboard on the screen 510 of the electronic device 101. The keyboard generated based on the authentication information may refer to a keyboard with keyboard keys in an arrangement changed based on the authentication information. The electronic device 101 may transmit information related to the changed form of the keyboard to the external electronic device 400 (e.g., the wearable device 200) communicatively connected to the electronic device 101.

According to various embodiments, the electronic device 101 may generate a keyboard based on at least one random number. The keyboard generated based on the random number may refer to a keyboard in which the arrangement of keyboard keys has been randomly changed. The electronic device 101 may transmit information related to the changed form of the keyboard to the external electronic device 400 (e.g., the wearable device 200) communicatively connected to the electronic device 101.

According to various embodiments, the electronic device 101 may also generate a keyboard based on authentication information and a random number. The keyboard generated based on the authentication information and the random number may refer to a keyboard in which the arrangement of keyboard keys has been changed based on the authentication information and the random number. The electronic device 101 may transmit information related to the changed form of the keyboard to the external electronic device 400 (e.g., the wearable device 200) communicatively connected to the electronic device 101.

According to various embodiments, the external electronic device 400 may receive the information related to the changed form of the keyboard from the electronic device 101 and display the keyboard (e.g., the keyboards 521, 620, and 821 illustrated in FIGS. 5B, 6, and 8B to be described below) on the screen through the display module 450 based on the received information related to the changed form of the keyboard. For example, the external electronic device 400 receives the information related to the changed form of the keyboard (e.g., the information related to the keyboard type) from the electronic device 101 through the communication circuit 470. The processor 420 of the external electronic device 400 may render a keyboard corresponding to the received keyboard-related information (e.g., the information related to the keyboard type) and display the keyboard through the display module 450.

According to various embodiments, when the user input to the text input field is received, and the text input field is identified as the predetermined field, the electronic device 101 may transmit index information corresponding to a keyboard selected from among a plurality of keyboards to the external electronic device 400. According to various embodiments, the external electronic device 400 may receive the index information corresponding to the keyboard from the electronic device 101 through the communication circuit 470 and render the keyboard corresponding to the received index information through the processor 420. For example, the external electronic device 400 displays the rendered keyboard (e.g., the keyboards 521, 620, and 821 illustrated in FIGS. 5B, 6, and 8B to be described later) through the display module 450 based on the index information.

According to various embodiments, when the user input to the text input field is received, and the text input field is identified as the predetermined field, the electronic device 101 may identify keyboard information customized by the user and transmit the customized keyboard information to the external electronic device 400. According to various embodiments, the external electronic device 400 may receive the customized keyboard information from the electronic device 101 through the communication circuit 470. The processor 420 of the external electronic device 400 may render a keyboard based on the received customized keyboard information. For example, the external electronic device 400 displays the keyboard (e.g., the keyboards 521, 620, and 821 illustrated in FIGS. 5B, 6, and 8B to be described later) rendered based on the customized keyboard information through the display module 450.

According to various embodiments, the external electronic device 400 may transmit data input based on the displayed keyboard to the electronic device 101 through the communication circuit 470. The electronic device 101 may process input of corresponding data (e.g., text) to the focused-on text input field, based on the data received from the external electronic device 400.

Referring to FIG. 5A, according to various embodiments, when a user input to a text input field is received, and the text input field is identified as a predetermined field, the electronic device 101 may transmit keyboard-related information to the external electronic device 400 (e.g., the wearable device 200) communicatively connected to the electronic device 101. Referring to FIG. 5B, according to various embodiments, the communication circuit 470 of the external electronic device 400 (e.g., the wearable device 200) may receive the keyboard-related information (e.g., information related to a keyboard type) from the electronic device 101. The processor 420 of the external electronic device 400 may render a keyboard based on the received keyboard-related information and display the keyboard on a screen 520 through the display module 450.

According to various embodiments, the electronic device 101 may display a keyboard controller 513 on the screen 510 by the display module 160. The keyboard controller 513 may be referred to as, but not limited to, a touch pad or a field control keypad. According to various embodiments, the electronic device 101 may display the keyboard controller 513 as an overlay on top of a screen region where an existing keyboard is displayed. According to various embodiments, the electronic device 101 may adjust the transparency or opacity of the keyboard controller 513 to blur or obscure the existing keyboard screen. According to various embodiments, the electronic device 101 may also display a specified image or user-set image other than the keyboard on top of the screen region where the existing keyboard is displayed.

According to various embodiments, when a touch input 514 (a touch may be understood to include touching, hovering, or dragging in the following description) is detected on the keyboard controller 513, the electronic device 101 may transmit information (e.g., coordinate information or area information) corresponding to the touch to the external electronic device 400 (e.g., the wearable device 200). The external electronic device 400 (e.g., the wearable device 200) may receive the information corresponding to the touch and display a position or region 522 corresponding to the touch within a keyboard 521 displayed on the screen 520 of the external electronic device 400.

According to various embodiments, when a specific position or region is touched as illustrated in FIG. 5A and then the touch is released, the electronic device 101 may transmit information corresponding to the release of the touch to the external electronic device 400 (e.g., the wearable device 200). The external electronic device 400 (e.g., the wearable device 200) may receive the information corresponding to the release of the touch and select text corresponding to a position or region 523 corresponding to the release of the touch within the keyboard 521 displayed on the screen 520. For example, in FIG. 5B, "G" 523 is selected in the keyboard 521. The external electronic device 400 (e.g., the wearable device 200) may transmit the text (e.g., "G") corresponding to the release of the touch to the electronic device 101. The electronic device 101 may process input of the text received from the external electronic device 400 (e.g., the wearable device 200) to the focused-on text input field.

According to various embodiments, when sequentially receiving data input by the method described above with reference to FIGS. 5A and 5B as "G," "r," "e," "a," and "t," the electronic device 101 may process input of characters (e.g., "Great") corresponding to the received data to the ID input field 511, as illustrated in FIG. 5C. According to various embodiments, a secure channel may be established between the electronic device 101 and the external electronic device 400 (e.g., the wearable device 200) to allow encrypted data to be transmitted and received.

Figure 6:
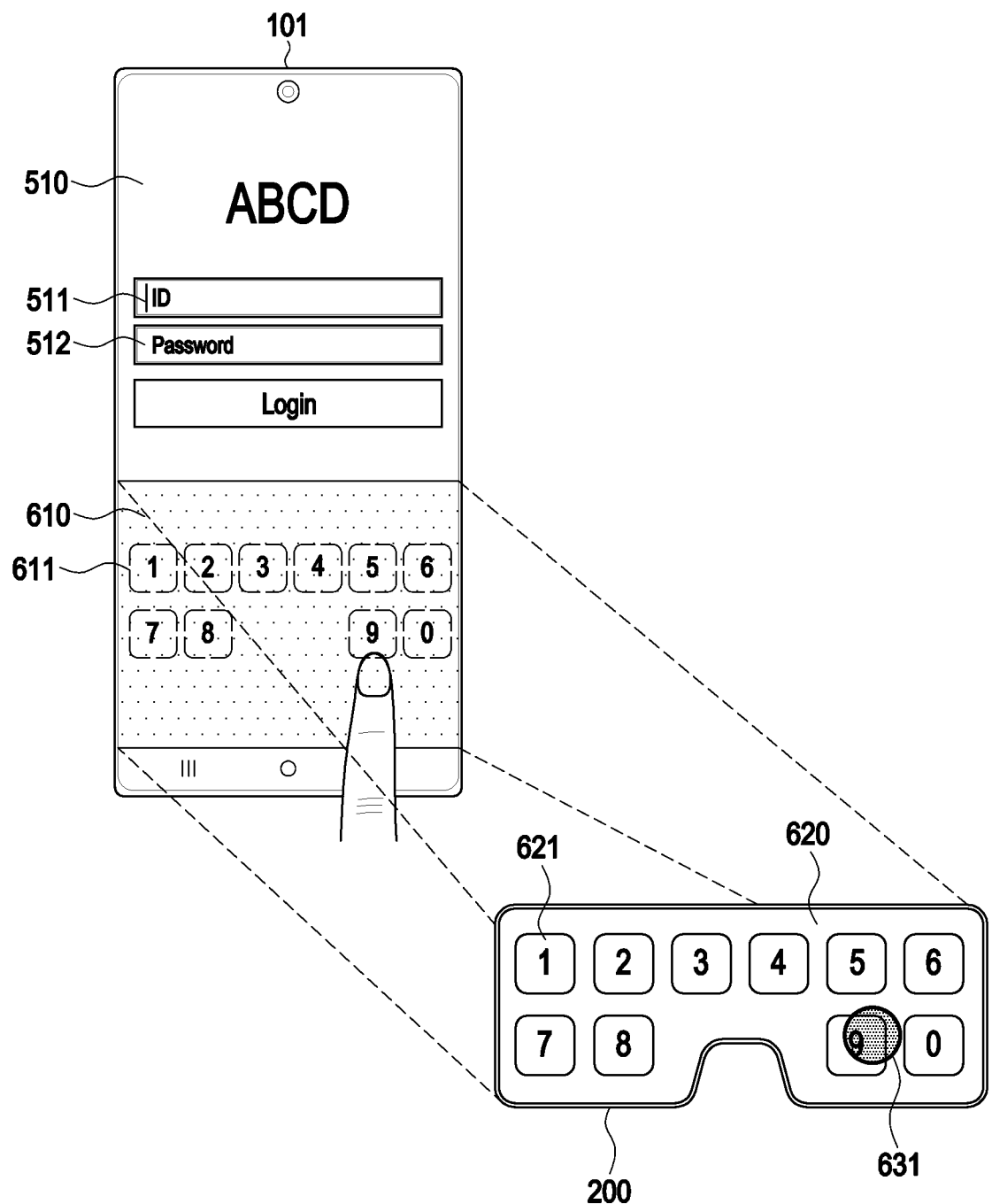
FIG. 6 illustrates screens displayed on an electronic device and a wearable device according to an embodiment of the disclosure.

FIG. 6 illustrates screens displayed on an electronic device and a wearable device according to an embodiment of the disclosure.

Referring to FIG. 6, when a user looks at a keyboard region 610 of the electronic device 101, wearing the external electronic device 400 (e.g., the wearable device 200), a keyboard 620 may be displayed on a screen of the external electronic device 400 (e.g., the wearable device 200), which is mapped to the keyboard region 610. For example, a number "1" 611 included in the keyboard region 610 of the electronic device 101 corresponds to the position of a number "1" 621 included in the keyboard 620 displayed on the external electronic device 400 (e.g., the wearable device 200). When the user hovers over a specific key or a specific number in the keyboard region 610 of the electronic device 101, data detected by the hovering (e.g., position information or coordinate information or region information within the keyboard region 610) may be transmitted to the external electronic device 400 (e.g., the wearable device 200). The external electronic device 400 (e.g., the wearable device 200) may indicate hovering at a position 631 corresponding to the data received from the electronic device 101 (e.g., the position information or coordinate information or region information within the keyboard region 610) within the keyboard 620. According to various embodiments, when the user touches the hovered position, information corresponding to the touched position may be transmitted to the external electronic device 400 (e.g., the wearable device 200). The external electronic device 400 (e.g., the wearable device 200) may process text corresponding to the touched position within the keyboard 620 as selected and transmit information corresponding to the selected text to the electronic device 101. The electronic device 101 may process the text as input to the focused-on text input field (e.g., the ID input field 511), based on the information corresponding to the text received from the external electronic device 400 (e.g., the wearable device 200).

Figure 7A:
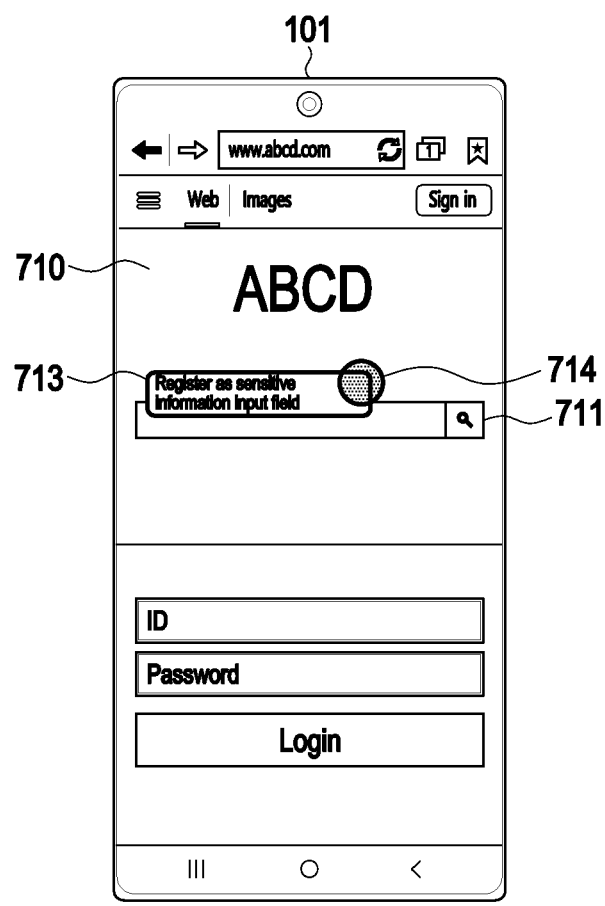
FIG. 7A illustrates a settings registration screen displayed on an electronic device according to an embodiment of the disclosure.

FIG. 7A illustrates a settings registration screen displayed on an electronic device according to an embodiment of the disclosure.

Figure 7B:
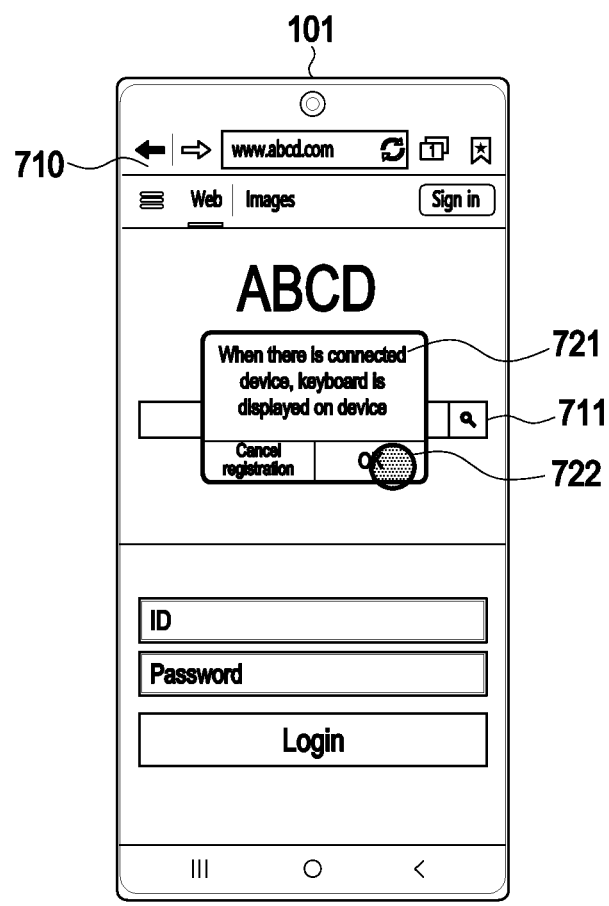
FIG. 7B illustrates a settings registration screen displayed on an electronic device according to an embodiment of the disclosure.

FIG. 7B illustrates a settings registration screen displayed on an electronic device according to an embodiment of the disclosure.

Referring to FIG. 7A, the electronic device 101 may display at least one text input field on a screen 710 of the electronic device 101 through the display module (e.g., the display module 160 of FIG. 1). For example, the text input field includes, but not limited to, a search term input field 711. According to various embodiments, the search term input field 711 may be specified or set as a secure information input field (or sensitive information input field) based on user settings. For example, when the user does not want the search term input field within a specific website or a specific app to be visible to others, the user sets the field as a secure information input field (or sensitive information input field).

Referring to FIG. 7A, when receiving a set input (e.g., a long press) in the search term input field 711, the electronic device 101 may display a specified function setup menu (e.g., tooltip) 713. The function setup menu may include at least one function for registering a secure information input field (or sensitive information input field). When the user selects (714) the function setup menu 713, a secure information input field (or sensitive information input field) registration window 721 may be displayed, as illustrated in FIG. 7B. The user may register the corresponding text input field (e.g., the search term input field 711) as a secure information input field by selecting an OK button 722 in the secure information input field registration window 721. Thereafter, when the registered search term input field 711 is focused on as described above, the electronic device 101 may process input of text to the search term input field 711 using the external electronic device 400 (e.g., the wearable device 200).

According to various embodiments, when the user selects (714) the function setup menu 713 and registers a secure information input field through the secure information input field registration window 721, the electronic device 101 may store data about the newly set secure information input field, including an ID of the text input field along with a package name of a corresponding app. According to various embodiments, when storing the data about the secure information input field, the electronic device 101 may store a web browser uniform/universal resource locator (URL) in the memory.

Figure 8A:
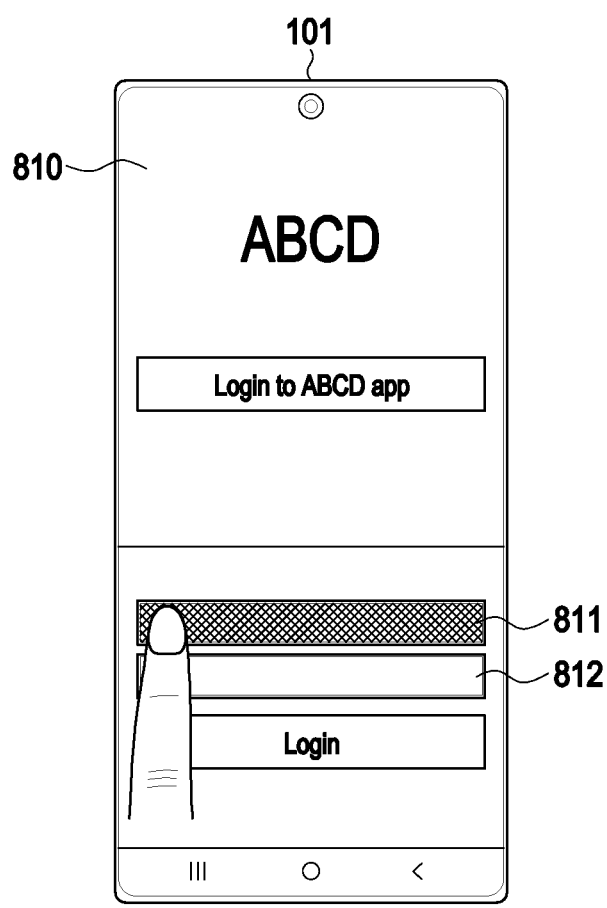
FIG. 8A illustrates a screen displayed on an electronic device according to an embodiment of the disclosure.

FIG. 8A illustrates a screen displayed on an electronic device according to an embodiment of the disclosure.

Figure 8B:
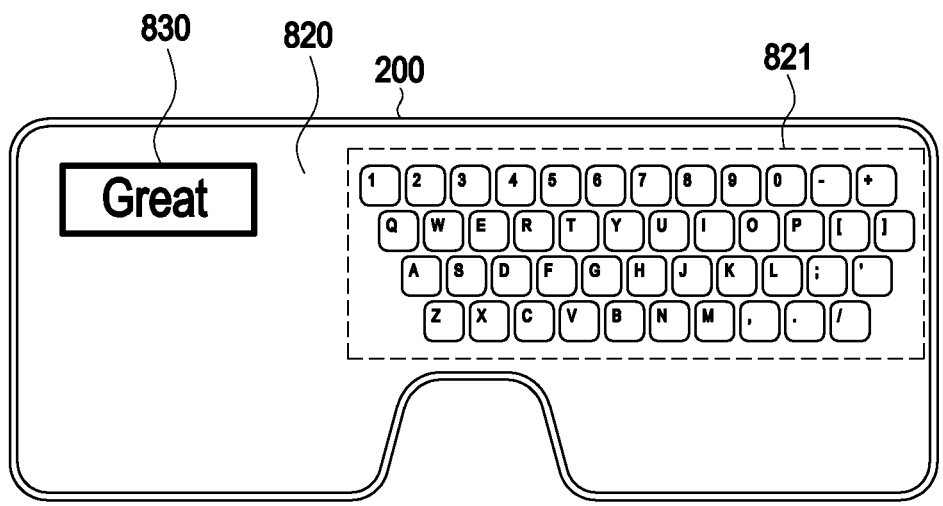
FIG. 8B illustrates a screen displayed on a wearable device according to an embodiment of the disclosure.

FIG. 8B illustrates a screen displayed on a wearable device according to an embodiment of the disclosure.

The electronic device 101 may display an ID input field 811 and/or a password input field 812 for logging into a specific webpage or a specific homepage, as a text input field on the screen 810. According to various embodiments, the ID input field 811 or the password input field 812 may be referred to or set as a secure information input field (or sensitive information input field).

According to various embodiments, the electronic device 101 may configure, by user settings, whether data input to the text input field is to be displayed on the electronic device 101 or to be displayed using the external electronic device 400 (e.g., the wearable device 200). For example, when data input in the ID input field 811 among text input fields is set to be displayed using the external electronic device 400 (e.g., the wearable device 200), the electronic device 101 controls the input data not to be displayed by shading or disabling the ID input field 811, and the external electronic device 400 (e.g., the wearable device 200) displays data 830 input to the ID input field 811 along with a keyboard 821 on a screen 820. According to various embodiments, when the attribute of the text input field is password or the user has registered the text input field as a secure information input field, the electronic device 101 may control the text input field to be hidden so that it is not automatically displayed. According to various embodiments, when data input to the security information input field is set to be displayed using the external electronic device 400 (e.g., the wearable device 200), a package name, an activity name, a text field ID, a hidden flag, and a browser's URL may be stored in the memory (e.g., the memory 130 of the electronic device 101), when the secure information input field is registered.

Figure 9:
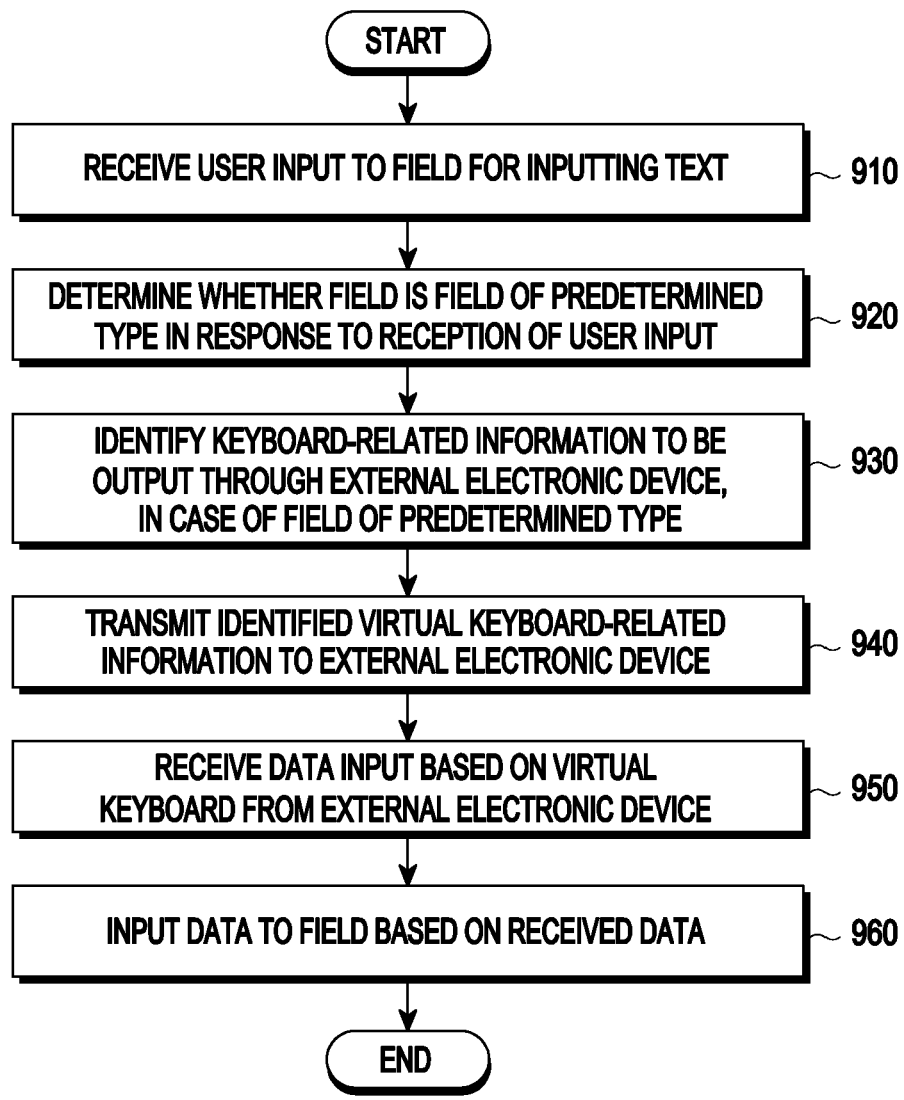
FIG. 9 is a flowchart illustrating operations performed by an electronic device according to an embodiment of the disclosure.

FIG. 9 is a flowchart illustrating operations performed by an electronic device according to an embodiment of the disclosure.

Referring to FIG. 9, the electronic device 101 may receive a user input to a text input field in operation 910.

According to various embodiments, the electronic device 101 may identify whether the text input field is a predetermined field (e.g., a secure information input field or a field specified as a secure information input field by user settings) in response to the reception of the user input to the text input field in operation 920. For example, the user input to the text input field includes an input that causes the text input field to be in a focus on state. For example, the user input includes on a touch (e.g., direct touch or hovering) in a region corresponding to the text input field or focus on based movement of a cursor to the text input field or a field change by inputting a tap button. According to various embodiments, the electronic device 101 may identify whether the text input field is a predetermined field (e.g., a secure information input field or a field specified as a secure information input field by user settings), when a touch input is detected in the text input field or the text input field is focused on.

According to various embodiments, when the text input field is identified as a field of a predetermined type, the electronic device 101 may identify keyboard-related information to be output to the external electronic device (e.g., the wearable device 200) in operation 930. For example, when the user input to the text input field is received and the text input field is identified as the predetermined field, the electronic device 101 identifies the keyboard-related information for the external electronic device 400 (e.g., the wearable device 200), instead of displaying a keyboard on the screen 510 of the electronic device 101. In operation 940, the electronic device 101 may transmit the identified keyboard-related information to the external electronic device 400 (e.g., the wearable device 200) communicatively connected to the electronic device 101.

According to various embodiments, the external electronic device 400 may receive the keyboard-related information (e.g., information related to a keyboard type) from the electronic device 101 through the communication circuit 470. The external electronic device 400 may render a keyboard based on the received keyboard-related information through the processor 420 and display the keyboard on a screen through the display module 450.

According to various embodiments, the external electronic device 400 may transmit data input based on the displayed keyboard to the electronic device 101. The electronic device 101 may receive the data input through the keyboard from the external electronic device 400 in operation 950. The electronic device 101 may process input of corresponding data (e.g., text) to the focused-on text input field based on the received data in operation 960.

Figure 10:
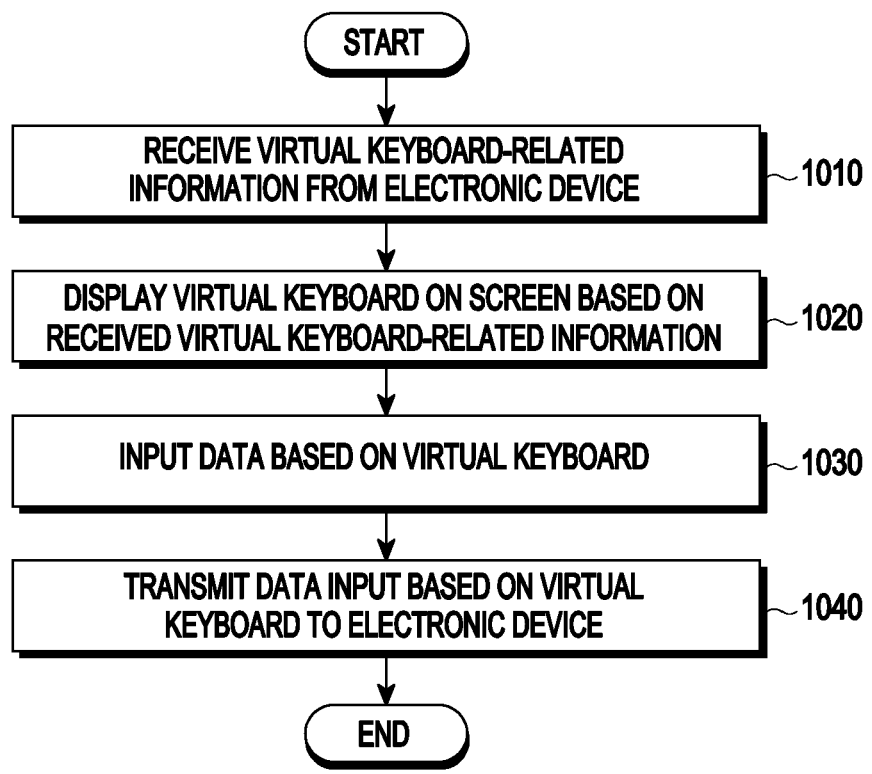
FIG. 10 is a flowchart illustrating operations performed by a wearable device according to an embodiment of the disclosure.

FIG. 10 is a flowchart illustrating operations performed by a wearable device according to an embodiment of the disclosure.

Referring to FIG. 10, the external electronic device 400 may receive keyboard-related information (e.g., information related to a keyboard type) from the electronic device 101 through the communication circuit 470 in operation 1010.

According to various embodiments, the external electronic device 400 may render a keyboard through the processor 420 based on the received keyboard-related information and display the keyboard on a screen through the display module 450 in operation 1020.

According to various embodiments, the external electronic device 400 may input data through the keyboard in operation 1030.

According to various embodiments, the external electronic device 400 may transmit the data input through the keyboard to the electronic device 101 in operation 1040.

Figure 11:
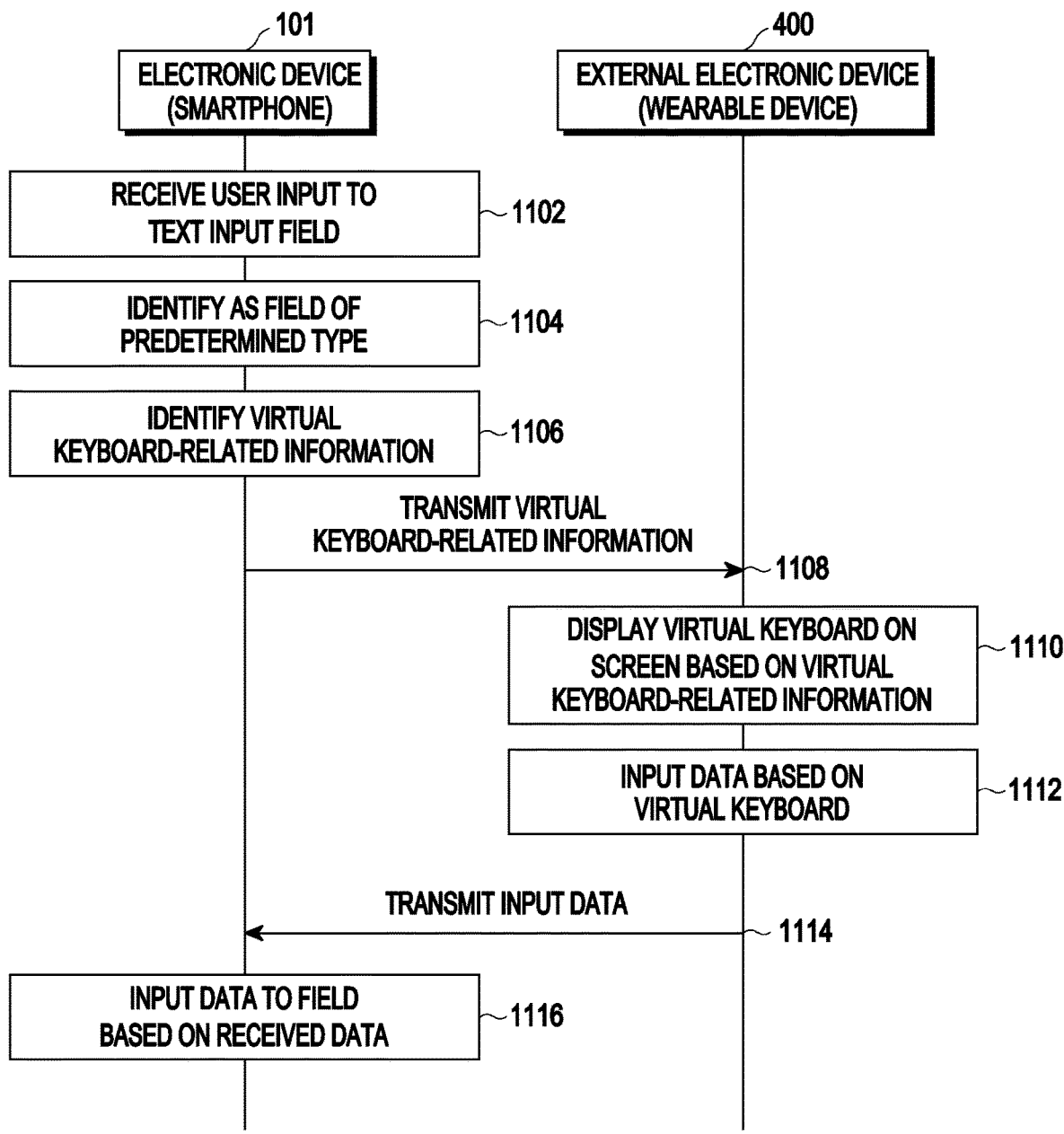
FIG. 11 is a diagram illustrating a signal flow between an electronic device and an external electronic device according to an embodiment of the disclosure.

FIG. 11 is a diagram illustrating a signal flow between an electronic device and an external electronic device according to an embodiment of the disclosure.

Referring to FIG. 11, according to various embodiments, the electronic device 101 may receive a user input to a text input field in operation 1102.

According to various embodiments, when the text input field for which the user input has been received is identified as a field of a predetermined type in operation 1104, the electronic device 101 may identify keyboard-related information (e.g., information related to a keyboard type) in operation 1106.

According to various embodiments, the electronic device 101 may transmit the keyboard-related information to the external electronic device 400 (e.g., the wearable device 200) in operation 1108.

According to various embodiments, the external electronic device 400 may render a keyboard based on the keyboard-related information and display the keyboard on a screen in operation 1110. The external electronic device 400 may receive data input through the keyboard in operation 1112, and transmit the input data to the electronic device 101 in operation 1114.

According to various embodiments, the electronic device 101 may process input of the received input data to the text input field in operation 1116.

Figure 12:
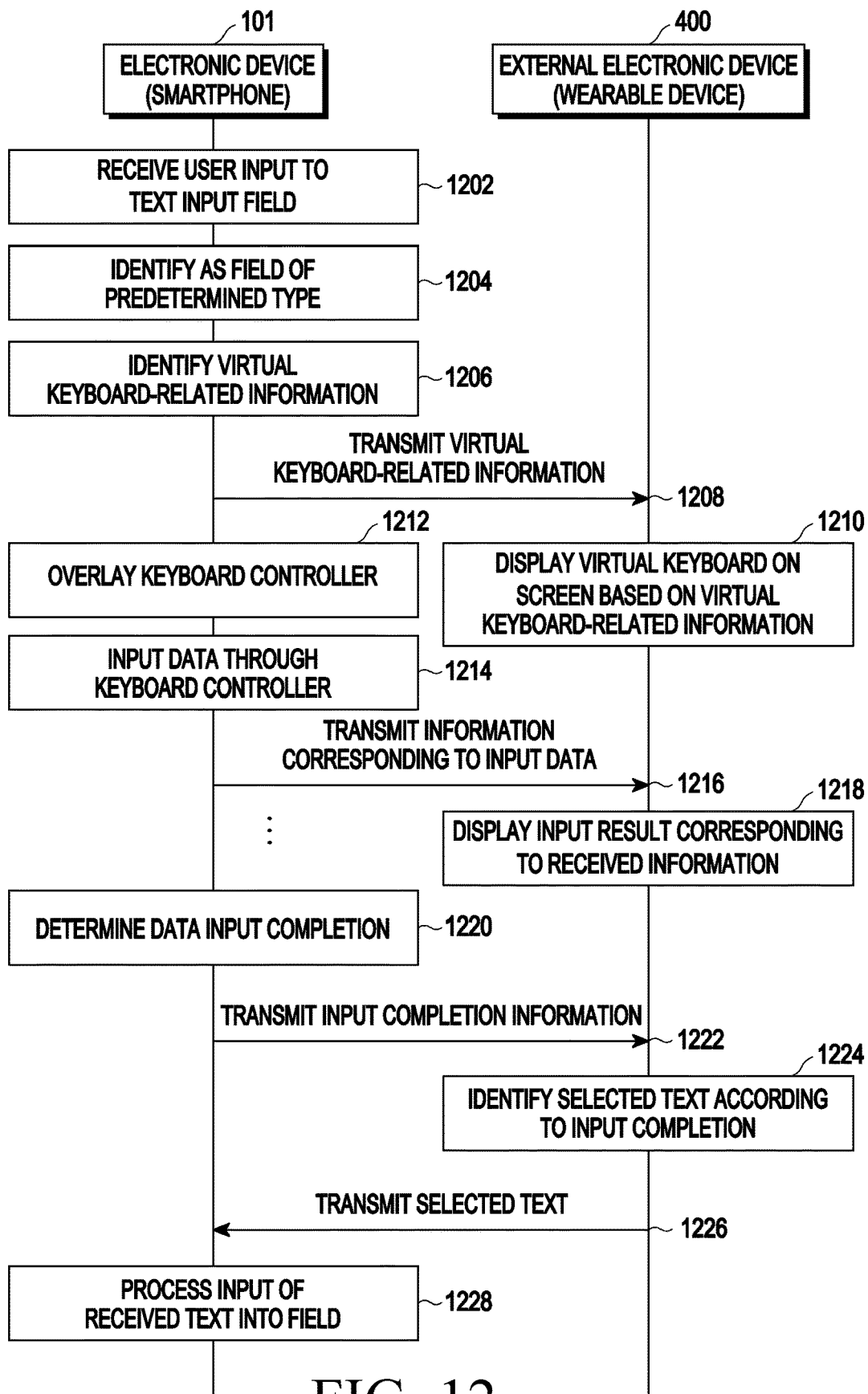
FIG. 12 is a diagram illustrating a signal flow between an electronic device and an external electronic device according to an embodiment of the disclosure.

FIG. 12 is a diagram illustrating a signal flow between an electronic device and an external electronic device according to an embodiment of the disclosure.

Referring to FIG. 12, according to various embodiments, the electronic device 101 may receive a user input to a text input field in operation 1202.

According to various embodiments, when the text input field for which the user input has been received is identified as a field of a predetermined type in operation 1204, the electronic device 101 may identify keyboard-related information (e.g., information related to a keyboard type) in operation 1206.

According to various embodiments, the electronic device 101 may transmit the keyboard-related information to the external electronic device 400 (e.g., the wearable device 200) in operation 1208.

According to various embodiments, the external electronic device 400 may render a keyboard based on the keyboard-related information and display the keyboard on a screen in operation 1210. The electronic device 101 may overlay a keyboard controller (e.g., the keyboard controller 513 of FIG. 5A) as illustrated in FIG. in operation 1212.

According to various embodiments, the electronic device 101 may receive data input through the keyboard controller in operation 1214. The electronic device 101 may transmit information corresponding to the input data to the external electronic device 400 in operation 1216.

According to various embodiments, the external electronic device 400 may display an input result (e.g., 522 in FIG. 5B) corresponding to the information received from the electronic device 101 on a screen in operation 1218.

According to various embodiments, the electronic device 101 may determine completion of the data input in operation 1220. For example, when a touch is released as illustrated in FIG. 5A, the electronic device 101 determines that the input is completed and transmit input completion information to the external electronic device 400 in operation 1222.

According to various embodiments, the external electronic device 400 may identify selected text based on the input completion in operation 1224, and transmit the selected text (e.g., "G" 523 in FIG. 5B) to the electronic device 101 in operation 1226.

According to various embodiments, the electronic device 101 may process input of the received text to the text input field in operation 1228.

An electronic device according to any one of various embodiments may include a communication module, a display module, at least one processor operatively connected to the communication module and the display module, and memory operatively connected to the at least one processor. The memory may store instructions which, when executed by the at least one processor, cause the at least one processor to control to display a field for inputting text through the display module, receive a user input to the field for inputting text, identify whether the field is a field of a predetermined type in response to the reception of the user input, when the field is a field of the predetermined type, identify information related to a keyboard type to be output through an external electronic device, transmit the identified information related to the keyboard type to the external electronic device through the communication module, receive data input based on a keyboard corresponding to the keyboard type from the external electronic device, and input data to the field based on the received data.

According to various embodiments, the keyboard type may include the same shape as or a different shape from a keyboard displayed on the electronic device, when a user input is applied to the field.

According to various embodiments, the data input based on the keyboard may be received through a secure channel established between the electronic device and the external electronic device.

According to various embodiments, the keyboard may be generated using at least one of at least one piece of authentication information used when the electronic device is connected to the external electronic device, or a random number.

According to various embodiments, the instructions may be configured to cause the at least one processor to transmit index information corresponding to a keyboard selected from among a plurality of keyboards to the external electronic device.

According to various embodiments, the keyboard may include a keyboard customized by a user.

According to various embodiments, the instructions may be configured to cause the at least one processor to, when the field is a field of the predetermined type, display a keyboard controller on a screen by the display module, transmit data input through the keyboard controller to the external electronic device, receive at least one input data corresponding to the data input through the keyboard controller from the external electronic device, and process input of the received input data to the field.

According to various embodiments, the keyboard controller may include a touch pad, and the at least one processor may control transmission of information corresponding to coordinate information about a position touched on the touch pad to the external electronic device.

According to various embodiments, the instructions may be configured to cause the at least one processor to receive input data corresponding to a position at which the touch on the touch pad is released from the external electronic device, and process input of the received input data to the field.

According to various embodiments, the field of the predetermined type may be pre-settable by a user.

A method of inputting information using an external electronic device in an electronic device according to any one of various embodiments may include displaying a field for inputting text through a display module, receiving a user input to the field for inputting text, identifying whether the field is a field of a predetermined type in response to the reception of the user input, when the field is a field of the predetermined type, identifying information related to a keyboard type to be output through an external electronic device, transmitting the identified information related to the keyboard type to the external electronic device through a communication module, receiving data input based on a keyboard corresponding to the keyboard type from the external electronic device, and inputting data into the field based on the received data.

According to various embodiments, the keyboard type may include the same shape as or a different shape from a keyboard displayed on the electronic device, when a user input is applied to the field.

According to various embodiments, the data input based on the keyboard may be received through a secure channel established between the electronic device and the external electronic device.

According to various embodiments, the keyboard may be generated using at least one of at least one piece of authentication information used when the electronic device is connected to the external electronic device, or a random number.

According to various embodiments, the method may include transmitting index information corresponding to a keyboard selected from among a plurality of keyboards to the external electronic device.

According to various embodiments, the keyboard may include a keyboard customized by a user.

According to various embodiments, the method may include displaying a keyboard controller on a screen by the display module, transmitting data input through the keyboard controller to the external electronic device, receiving at least one input data corresponding to the data input through the keyboard controller from the external electronic device, and processing input of the received input data to the field.

According to various embodiments, the method may include transmitting information corresponding to coordinate information about a position touched on a touch pad to the external electronic device.

According to various embodiments, the method may include receiving input data corresponding to a position at which the touch on the touch pad is released from the external electronic device, and processing input of the received input data to the field.

According to various embodiments, the field of the predetermined type may be pre-settable by a user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) invokes at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   communication circuitry;
   a display;
   at least one processor; and
   memory storing instructions that, when executed by the at least one processor individually or collectively, cause the electronic device to:
   display, on the display, a field for inputting text,
   receive a user input applied to the field for inputting text,
   in response to receiving the user input, identify whether the field is a predetermined type, wherein the field of the predetermined type is at least one of a secure information input field or an information input field that has been specified by a user setting as the secure information input field,
   based on identifying that the field is the predetermined type, identify information related to a keyboard type to be output through an external electronic device,
   transmit, to the external electronic device through the communication circuitry, the information related to the keyboard type,
   receive, from the external electronic device, data input based on a keyboard corresponding to the keyboard type, and
   based on the received data, store, in the memory, text data corresponding to the field.

2. The electronic device of claim 1, wherein the keyboard type comprises a shape corresponding to a keyboard that is displayed on the electronic device, based on the user input being applied to the field.

3. The electronic device of claim 1, wherein the data input based on the keyboard is received through a secure channel established between the electronic device and the external electronic device.

4. The electronic device of claim 3, wherein the keyboard is generated using at least one of a random number or at least one piece of authentication information used when the electronic device is connected to the external electronic device.

5. The electronic device of claim 1, wherein the instructions, when executed by the at least one processor individually or collectively, cause the electronic device to:
   transmit, to the external electronic device, index information corresponding to a selected keyboard that is selected from among a plurality of keyboards.

6. The electronic device of claim 1, wherein the keyboard comprises a customized keyboard that is customized by a user.

7. The electronic device of claim 1, wherein the instructions, when executed by the at least one processor individually or collectively, cause the electronic device to:
- when the field is of the predetermined type, display, on a screen of the display, a keyboard controller,
- transmit, to the external electronic device, data input through the keyboard controller,
- receive, from the external electronic device, at least one input data corresponding to the data input through the keyboard controller, and
- process an input of the at least one input data to the field.

8. The electronic device of claim 7,
- wherein the keyboard controller comprises a touch pad, and
- wherein the instructions, when executed by the at least one processor individually or collectively, cause the electronic device to:
  - transmit, to the external electronic device, information corresponding to coordinate information about at least one position touched on the touch pad.

9. The electronic device of claim 8, wherein the instructions, when executed by the at least one processor individually or collectively, cause the electronic device to:
- receive, from the external electronic device, position input data corresponding to a position at which a touch on the touch pad is released, and
- process the input of the position input data to the field.

10. The electronic device of claim 1, wherein the field of the predetermined type is pre-settable by a user.

11. The electronic device of claim 1, wherein the keyboard type comprises a different shape from a keyboard that is displayed on the electronic device, when the user input is applied to the field.

12. The electronic device of claim 1, wherein the instructions, when executed by the at least one processor individually or collectively, cause the electronic device to:
- in response to identifying that the field is at least one of the secure information input field or the information input field that has been specified by the user setting as the secure information input field, identify that the field is of the predetermined type.

13. A method performed by an electronic device of inputting information using an external electronic device in the electronic device, the method comprising:
- displaying, by the electronic device, a field for inputting text through a display;
- receiving, by the electronic device, a user input to the field for inputting text;
- in response to receiving the user input, identifying whether the field is a predetermined type, wherein the field of the predetermined type is at least one of a secure information input field or an information input field that has been specified by a user setting as the secure information input field;
- based on identifying that the field is the predetermined type, identifying, by the electronic device, information related to a keyboard type to be output through an external electronic device;
- transmitting, by the electronic device to the external electronic device through communication circuitry, the information related to the keyboard type;
- receiving, by the electronic device from the external electronic device, data input based on a keyboard corresponding to the keyboard type; and
- based on the received data, storing, in memory, text data corresponding to the field.

14. The method of claim 13, wherein the keyboard type comprises a shape corresponding to a keyboard that is displayed on the electronic device, based on the user input being applied to the field.

15. The method of claim 13, wherein the data input based on the keyboard is received through a secure channel established between the electronic device and the external electronic device.

16. The method of claim 15, wherein the keyboard is generated using at least one of a random number or at least one piece of authentication information used while the electronic device is connected to the external electronic device.

17. The method of claim 13, further comprising:
- transmitting, by the electronic device to the external electronic device, index information corresponding to a selected keyboard that is selected from among a plurality of keyboards.

18. The method of claim 13, wherein the keyboard type comprises a different shape from a keyboard that is displayed on the electronic device, based on the user input being applied to the field.

* * * * *